April 18, 1944.  C. E. FREDERICKSON  2,346,833
HYDRAULIC BRAKE
Filed Feb. 12, 1943  6 Sheets-Sheet 1

Inventor
Clayton E. Frederickson
By Albert E. Dieterich
Attorney

April 18, 1944.　　C. E. FREDERICKSON　　2,346,833
HYDRAULIC BRAKE
Filed Feb. 12, 1943　　6 Sheets-Sheet 3

Inventor
Clayton E. Frederickson
By Albert E. Dieterich
Attorney

April 18, 1944.  C. E. FREDERICKSON  2,346,833
HYDRAULIC BRAKE
Filed Feb. 12, 1943  6 Sheets-Sheet 4
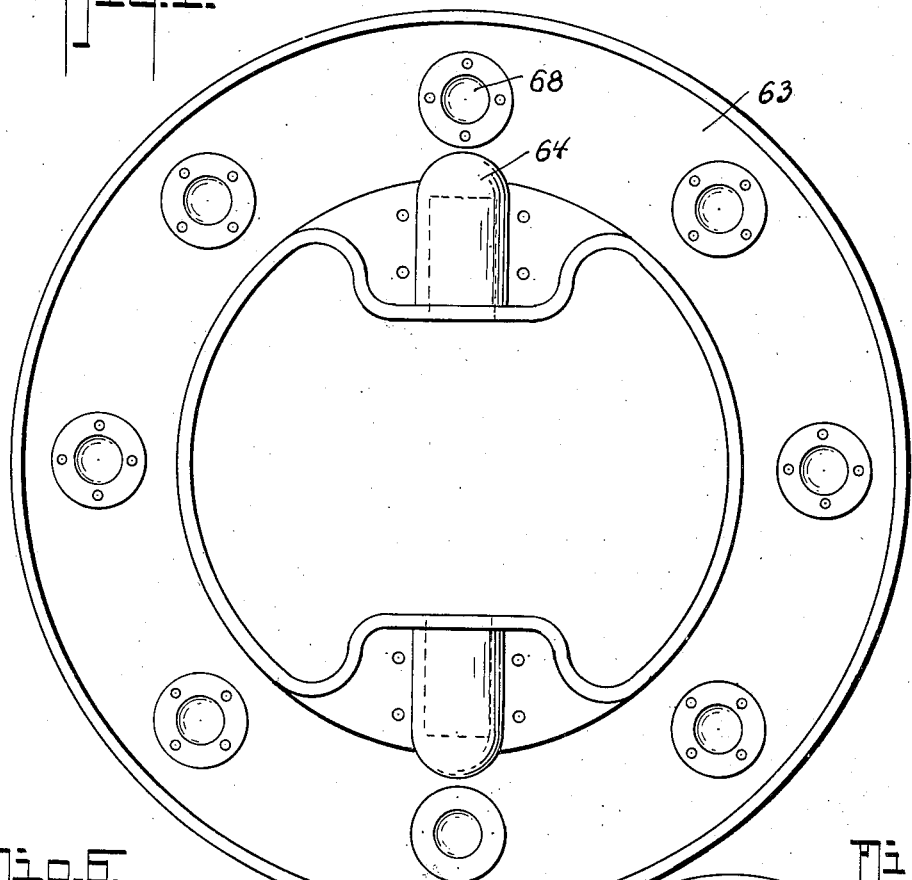
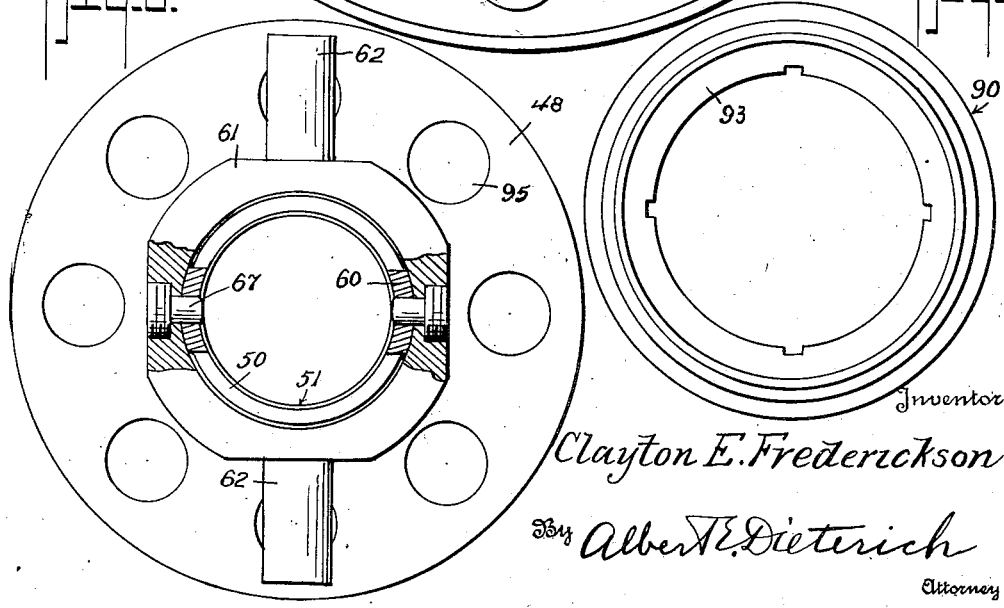
Inventor
Clayton E. Frederickson
By Albert E. Dieterich
Attorney April 18, 1944.　　C. E. FREDERICKSON　　2,346,833
HYDRAULIC BRAKE
Filed Feb. 12, 1943　　6 Sheets-Sheet 5

Inventor
Clayton E. Frederickson
By Albert E. Dieterich
Attorney

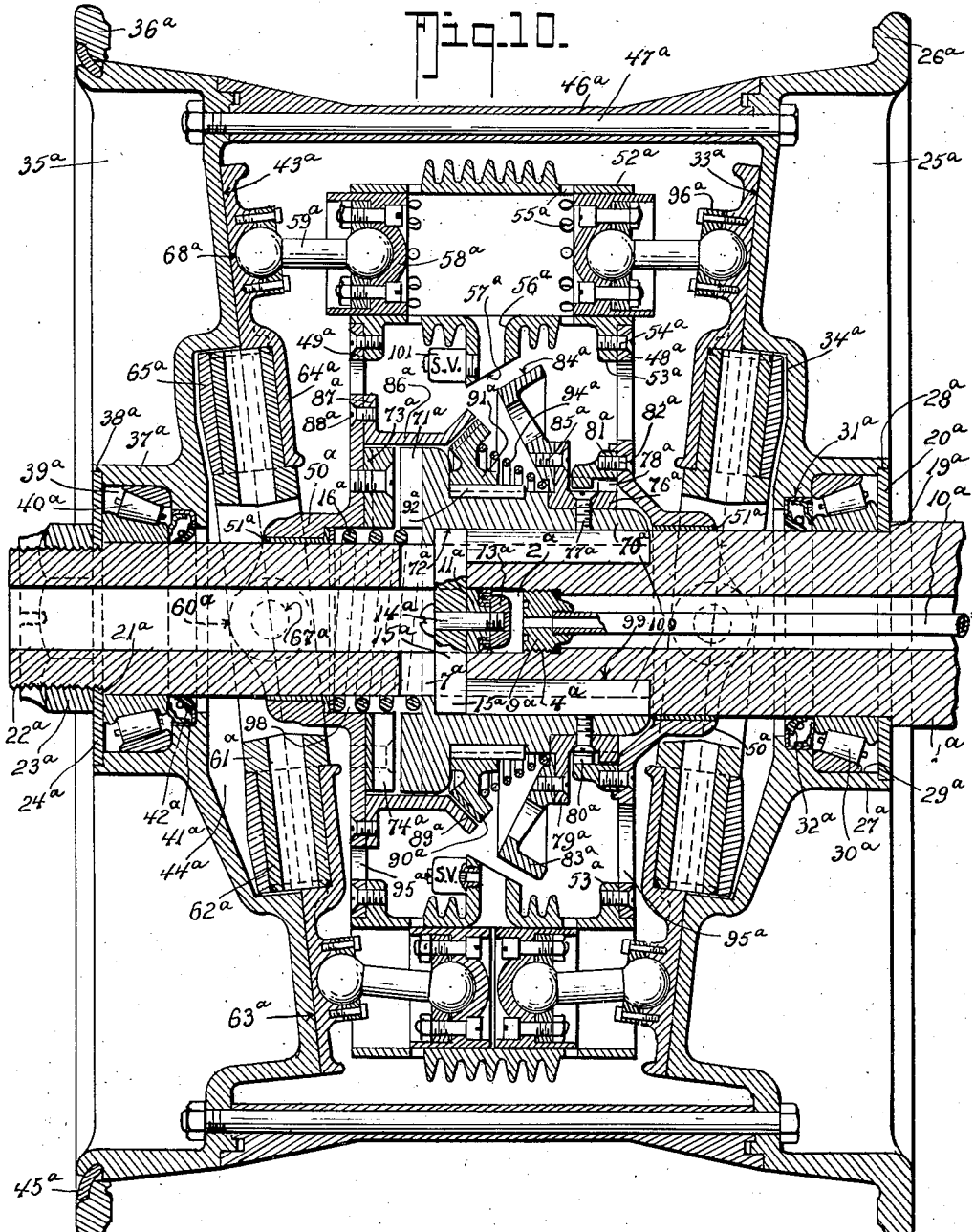

Patented Apr. 18, 1944

2,346,833

UNITED STATES PATENT OFFICE 2,346,833

HYDRAULIC BRAKE

Clayton Erasmus Frederickson, Chicago, Ill.

Application February 12, 1943, Serial No. 475,649

20 Claims. (Cl. 188—91)

My invention relates to the art of vehicle brakes and it particularly has for its object to provide an effective brake which is especially adapted for use on the wheels of airplanes.

Primarily the invention seeks to provide a simple, powerful hydraulic brake of a compact structure, one that is relatively light in weight, one that can be incorporated in an airplane wheel without much change in the design of the wheel, and one that will be relatively inexpensive to manufacture and install.

Another object of the invention is to provide a hydraulic brake, located within the wheel, which is so constructed that the wheel is well balanced so that, when no brake application is desired, the wheel may turn freely on its axle.

Again, it is an object to provide a hydraulic brake within the wheel, the mechanism of which is operatively controlled by means located in part within the axle on which the wheel turns.

Again, it is an object to provide means whereby the cylinders are protected against giving way under excessive pressure.

Further, it is an object to provide, in a modified form, means for taking the torque strains from the shifting key so that a shorter shifting key can be used than in the first embodiment of the invention.

Other objects will in part be obvious and in part will be pointed out hereinafter.

To the attainment of the aforesaid objects and ends the invention further resides in the novel details of construction, combination and arrangement of parts, all of which will be first fully described in the following detailed description, and then be particularly pointed out in the appended claims, reference being made to the accompanying drawings, in which:

Fig. 4 is an elevation of one face of one of the wabbler plates.

Fig. 6 is an elevation of one of the yoke members and the side plate of the rotor to which it is pivoted.

Fig. 7 is an elevation of the male friction clutch member.

Fig. 10 is a view similar to Fig. 1, but showing a modification of the form of the invention shown in Fig. 1.

Fig. 11 is a detail section of one kind of pressure-relief valve that may be used.

Figure 1:
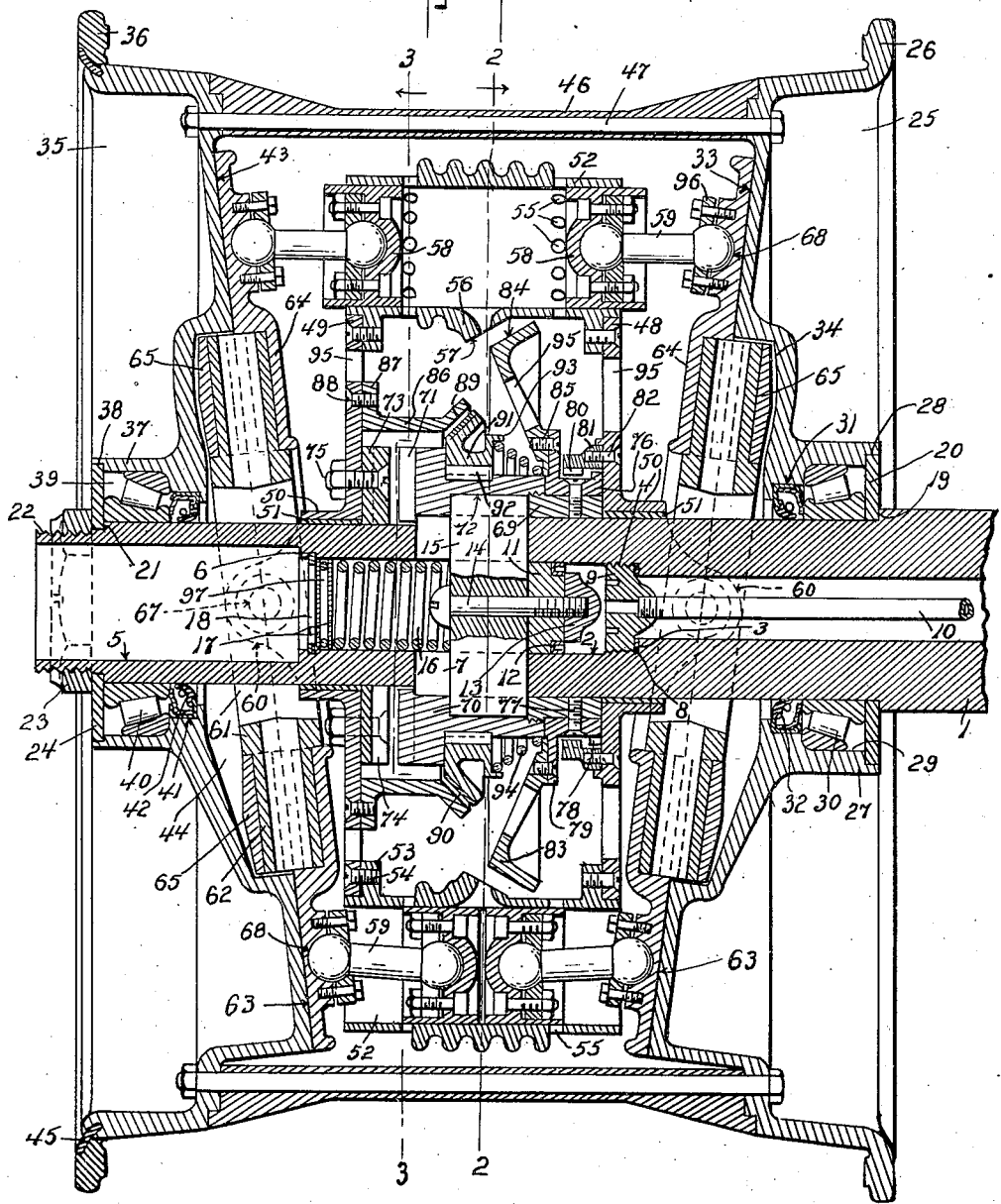
Fig. 1 is a central vertical longitudinal section of a preferred embodiment of my invention.
Figure 2:
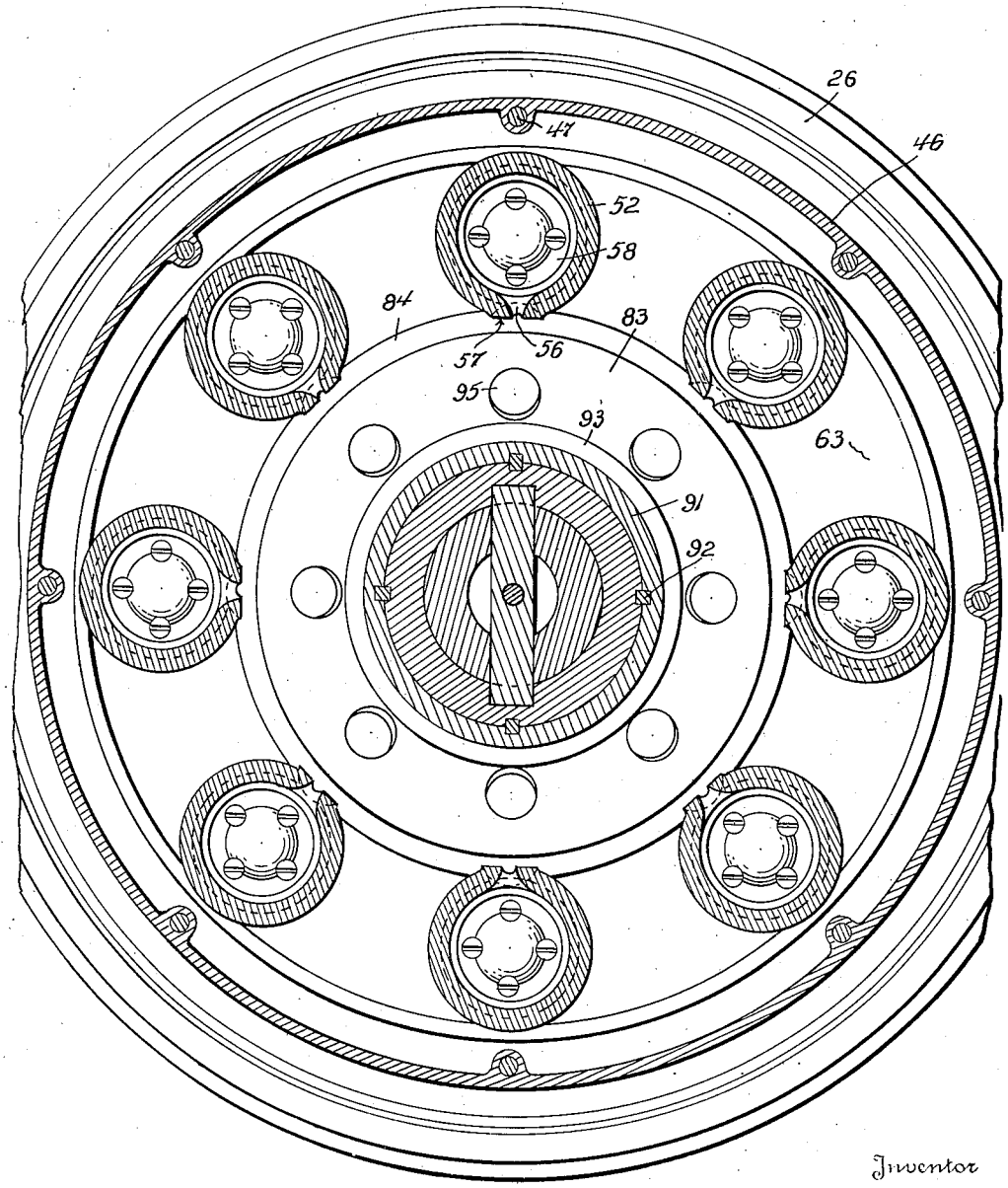
Fig. 2 is a transverse section on the line 2—2 of Fig. 1.
Figure 3:
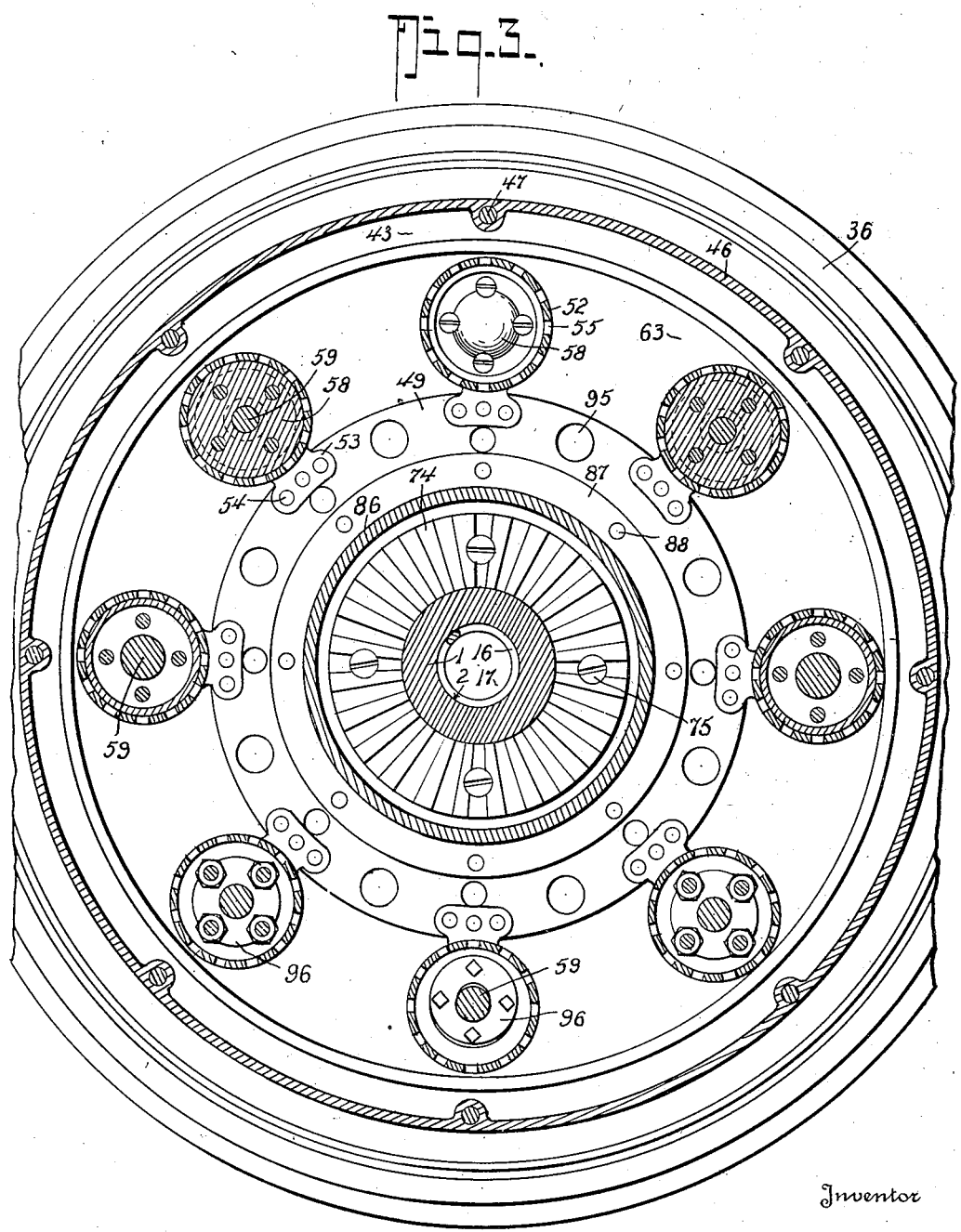
Fig. 3 is a transverse section on the line 3—3 of Fig. 1.
Figure 5:
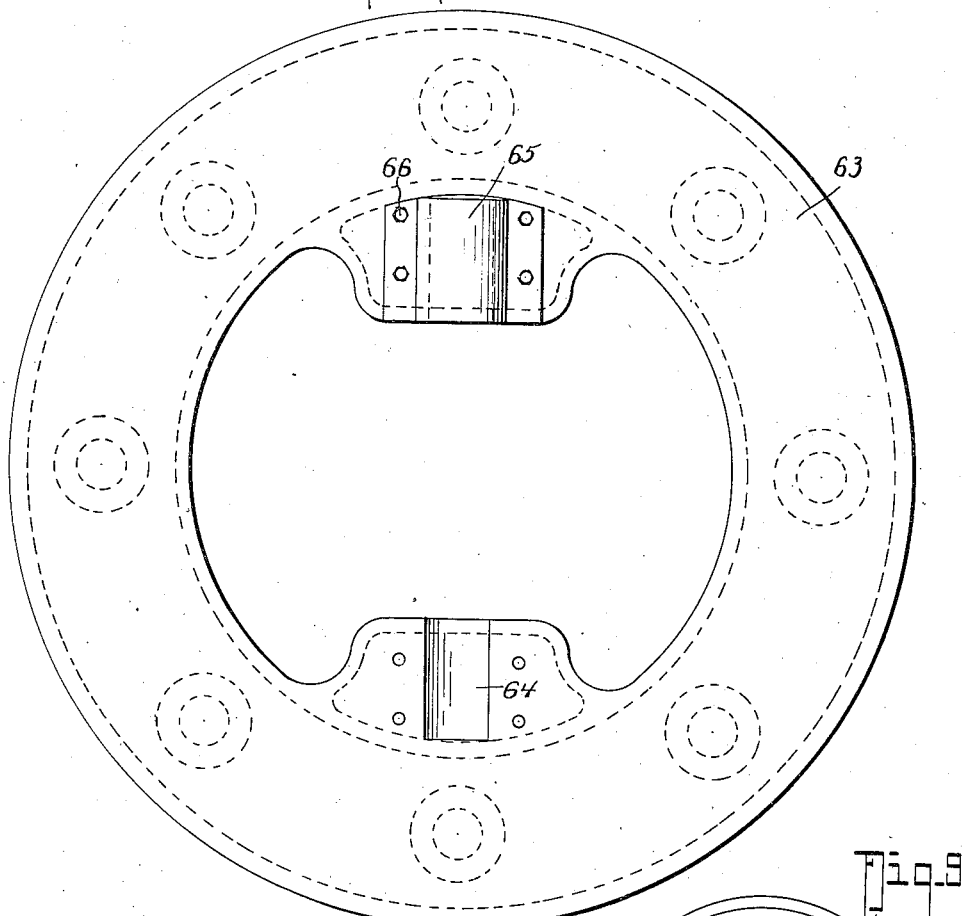
Fig. 5 is an elevation of the other face of the same.
Figure 8:
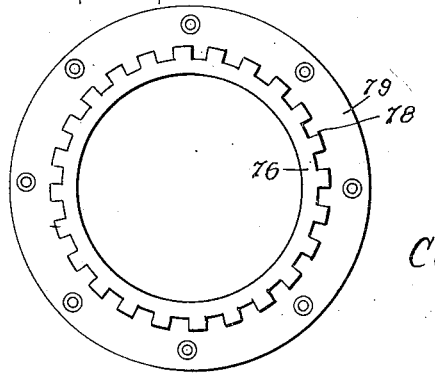
Fig. 8 is an elevation of one of the toothed clutch members.
Figure 9:
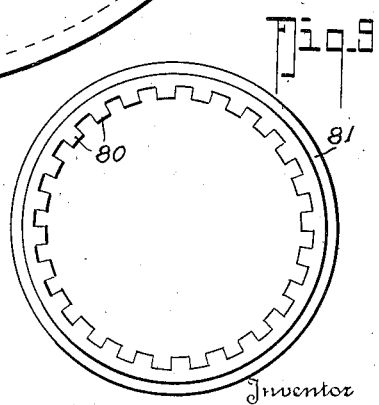
Fig. 9 is an elevation of the other clutch member that cooperates with that shown in Fig. 8.

In the drawings, in which like numerals of reference indicate like parts in all the figures, 1 represents the stationary shaft or axle on which the wheel is mounted. The axle 1 is counterbored as at 2, thus providing a shoulder 3 against which a washer 8 is held by the threaded plug 9 which is screwed into the threaded part 4 of the axle.

Near its outer end the axle 1 is further counterbored, as at 5, adjacent which end there is provided a groove 6 to receive the split ring 18. The axle also has a cross slot 7 for the key 15.

The plug 9 is bored and tapped to receive the oil line 10 which leads oil from the aviator's brake-applying pedal to the counter-bore 2. At one side of the key 15, and within the counter-bore 2, is a piston 11 carrying a packing cup 12 which is secured to the key 15 by a bolt 14 and nut 13. At the other side of the key 15, and within the counter-bore 2, is a return spring 16, a pair of sealing discs 17 (held by a wire ring 97), and a sealing ring 18 (see Fig. 1).

The axle 1 has shoulders 19 and 21, against which are held discs 20 and 24. The axle is threaded at its outer end, as at 22, to receive the castle nut 23.

The wheel proper comprises the sides 25 and 35, the tire retaining flanges 26 and 36 (the latter being removably held in place by the locking ring 45), the annular center portion 45, and the bolts and nuts 47 which hold the side plates 25 and 35 and the central portion 46 together. The side plates 25 and 35, respectively, have tubular hubs 27 and 37 whose outer ends are recessed, as at 28 and 38 respectively, to receive the discs 20 and 24. The hubs 27 and 37 are bored, as at 29 and 39 respectively, to receive the anti-friction bearings 30 and 40, respectively. The hubs are further bored, as at 31 and 41, respectively, to receive the oil seals 32 and 42, as shown in Fig. 1.

The side 25 of the wheel has an inclined slideway 33, while the side 35 has an inclined slideway 43, the slideways being inclined in opposite directions as shown in Fig. 1. The sides of the wheel are also provided with recesses 34 and 44 respectively.

Within the wheel and normally freely rotatable on the axle 1 is a rotor. In the embodiments of my invention illustrated in the drawings, the rotor comprises a pair of spaced side discs 48 and 49 having hubs 50 suitably bushed as at 51. Between these discs are mounted cylinders 52 by means of lugs 53 and screws 54, the axes of the cylinders lying parallel with that of the axle 1 and spaced equidistant therefrom. The cylinders each have oil inlet apertures 55 and a fluid outlet nipple 56. The nipples have inclined faces 57 to cooperate with the frusto-conical face 84 of a valve 83, hereinafter more fully explained.

Within each cylinder 52 is a pair of opposed pistons 58. Each piston 58 is connected to a wabbler. Each wabbler includes a yoke 61 having a pair of stub shafts 62 radiating therefrom, and a slide plate 63 having radially disposed half-bearings 64 for the stub shafts 62, and having connecting-rod bearing sockets 68. Rods 59 connect the pistons 58 with their respective wabbler slide plates. Other half-bearings 65 cooperate with the half-bearings 64 to hold the plates 63 to the yokes 61. The half-bearings 65 are held in place by screws 66.

The hubs 50 have ears 60 to which the yokes are pivoted on trunnion pins 67. The axis passing through the stub shafts 62 lies at right angles to that passing through the trunnion pins 67. Thus the wabblers are universally mounted on the respective hubs 50 of the rotor and function as a part of the rotor.

Mounted to turn on the axle 1 adjacent the key slot 7 is a ring 69 and a major clutch sleeve 70. The ring 69 and sleeve 70 are secured together to slide on the axle. The sleeve 70 has clutch teeth 71 to mesh, at times, with the clutch teeth 74 on the disc or plate 73 that is attached to the side disc 49 of the rotor by bolts 75. The sleeve 70 also has key sockets 72 to receive the key 15, which prevents the sleeve from turning on the axle.

Secured to the ring 69, by screws 77 or in any other suitable way, is a minor clutch sleeve 76 having clutch teeth 78 to mesh at times with clutch teeth 80 on a ring 81 that is secured to the side discs 48 of the rotor by means of screws 82. The sleeve 76 has a flange 79 to which is fastened, in any suitable way—as by screws 85— the valve 83 hereinbefore referred to.

Secured to the side disc 49 of the rotor by screws 88, or in any other suitable way, passing through its flange 87 is a cylinder 86 having a female friction clutch face 89 preferably of the cone type. A shiftable male friction clutch 91 has its clutch face 90 disposed to cooperate with the face 89 at times, as will more clearly appear later. The clutch 91 is keyed to the sleeve 70 by keys 92 and is constantly urged toward its clutching position by a cone-shaped spring 94 that exerts as much power open as when closed. The clutch 91, while it is keyed to the sleeve 70, is also slidable on the sleeve. The spring 94 lies between the flange 93 and the valve 83.

Suitably located oil passages 95 are provided in the discs 48 and 49 and in the valve 83.

Caps 96 hold the ball ends of the connecting rods in the sockets 68.

The embodiment of the invention shown in Fig. 10 does not differ in principle or general mode of operation from the preceding embodiment.

It does, however, differ in some more or less minor details. For instance, instead of locating the spring 16 inside the chamber 5 of the shaft 1 (Fig. 1), the return spring 16ª (Fig. 10) is located around the shaft in a recess 98 in one of the hubs 50ª; the shifting key 15ª is made narrower than the key 15 and the ring 69 and sleeve 70 (Fig. 1) are made in one and numbered 70ª in Fig. 10; long keys 100 secure the sleeve 70ª to the shaft against rotation while permitting the sleeve to slide along the shaft 1ª.

The embodiment of the invention shown in Fig. 10 also differs from that of Fig. 1 in that the outlet nipples 56ª are longer than those in Fig. 1 and the valve 83ª is correspondingly smaller, so that I may provide pressure-relief safety valves 101 to permit escape of fluid, should the pressure within the cylinder be great enough to burst the cylinders. Any suitable pressure-relief valve may be used. For illustrative purposes I have shown a valve in Fig. 11 which may be used. The safety valve shown in Fig. 11 consists of a casing having a valve seat 102 for the valve 103. The valve is held seated by a spring 105 in the neck 104, which spring presses against the valve and against a disc 106 having a conical depression for the end of the adjusting screws 107, a lock nut 108 being provided for the usual purpose.

*Operation*

Assume the parts to be in the position shown in Fig. 1. It will be seen that the friction clutch faces 89 and 90 lie close together but are not in contact; the clutch teeth 71 and 74 lie wide apart, as do also the teeth 78 and 80. The normal space between the teeth 71 and 74 and that between the teeth 78 and 80 is the same, or approximately so. The space between the valve face 84 and the faces 57 of the cylinder oil outlet nipples is such that the clutch teeth 71—74 and 78—80 must be fully meshed before the valve 83 will fully close the outlets 56.

Now, with the parts positioned as just before described, when the aviator desires to apply the brake, he forces fluid through the pipe 10 into the chamber between the plug 9 and piston 11, and thereby causes the piston to move from right to left in Fig. 1. The movement of the piston is transmitted through the key 15 to the sleeve 70 and to the ring 69 and the sleeve 76. As sleeve 76 carries the female friction clutch 91, the friction clutch face 90 will contact face 89 almost instantly and bring the rotor to a stop before the clutch teeth mesh. As the sleeve 72 moves from right to left, valve 83 is also so moved, thereby bringing faces 84 and 57 closer together and offering increasing resistance to the escape of fluid through outlets 56. It will of course be understood that the farther the piston 11 is forced toward the left, the more completely the clutch teeth will be engaged and the more fully the outlets 56 will be closed. The more fully the outlets 56 are closed, the greater the friction between the wabbler faces and the slideways and hence the more powerful the braking action until the wheel is hydraulically locked to the axle when the outlets 56 are fully closed.

On releasing the brake clutch the teeth come out of mesh before the friction clutch faces separate. Because of the fact that the friction clutch, during the application of the brake, engages first and reduces the speed of the wheel to approximately zero, there will be no clashing of teeth while the toothed clutches are being brought into mesh.

Those parts in Fig. 11 which correspond to like or similar parts in the preceding figures bear the same reference number plus the index letter *a*, so a detailed description of Fig. 11 is thought to be unnecessary.

Changes and modifications in the details of construction and arrangement of parts may be made without departing from the invention within the scope of the appended claims.

This application is, in part, a continuation of my application filed December 12, 1942, Ser. No. 467,878.

From the foregoing description, taken in connection with the accompanying drawings, it is thought the complete construction, operation and advantages of my invention will be clear to those skilled in the art.

What I claim is:

1. A wheel having a rim and sides provided with hubs; an axle on which said wheel is mounted, said wheel and axle enclosing a chamber for retaining hydraulic fluid; a rotor located within said wheel and rotatably mounted on said axle; an inclined slideway on the inside of the wheel; a universally mounted wabbler having a plate frictionally cooperatively engaging said slideway; said rotor including cylinders and pistons with connecting rods between the pistons and said wabbler, said cylinders having piston controlled fluid inlets and having fluid outlets; means for first frictionally clutching said rotor to said axle and subsequently positively securing said rotor to said axle; and means for controlling the escape of fluid from said cylinders for purposes described.

2. A chambered wheel having hubs; an axle on which said hubs are mounted; an inclined slideway within the chamber of the wheel; a rotor located within said chamber and rotatably mounted on said axle, said rotor including side discs, cylinders connecting the side discs, pistons in said cylinders, a wabbler, and connecting rods between said pistons and said wabbler, said wabbler being engaged with said slideway, said cylinders each having a liquid inlet and a liquid outlet; a friction clutch connection between said axle and said rotor; a toothed clutch connection between said axle and said rotor; means operating first to engage said friction clutch and upon further movement to engage said toothed clutch connections to stop the rotor; and means to operate said clutch connections to de-clutch the rotor from the axle.

3. A wheel having a rim and sides provided with hubs; an axle on which said wheel is mounted, said wheel and axle enclosing a chamber for retaining hydraulic fluid; a rotor located within said wheel and rotatably mounted on said axle; an inclined slideway on the inside of the wheel; a universally mounted wabbler having a plate frictionally cooperatively engaging said slideway, said rotor including cylinders and pistons with connecting rods between the pistons and said wabbler, said cylinders having piston controlled fluid inlets and having fluid outlets; means for first frictionally clutching said rotor to said axle and subsequently positively securing said rotor to said axle; means for controlling the escape of fluid from said cylinders for purposes described; and a valve device common to all said cylinder outlets for retarding the flow of liquid through said outlets while the clutches are in action.

4. A chambered wheel having hubs; an axle on which said hubs are mounted; an inclined slideway within the chamber of the wheel; a rotor located within said chamber and rotatably mounted on said axle, said rotor including side discs, cylinders connecting the side discs, pistons in said cylinders, a wabbler, and connecting rods between said pistons and said wabbler, said wabbler being engaged with said slideway, said cylinders each having a liquid inlet and a liquid outlet; a friction clutch connection between said axle and said rotor; a toothed clutch connection between said axle and said rotor; means operating first to engage said friction clutch and upon further movement to engage said toothed clutch connections to stop the rotor; means to operate said clutch connections to de-clutch the rotor from the axle; and a valve device common to all said cylinder outlets for retarding the flow of liquid through said outlets while the clutches are in action.

5. A wheel comprising a hollow body having sides with hubs and having an annular rim connecting said sides to enclose therewith a fluid containing chamber, said wheel having an annular inclined slideway; an axle on which said wheel is rotatably mounted; means to seal the wheel and axle against escape of the liquid contents of the wheel; a rotor including spaced discs having hubs rotatably mounted on said axle, cylinders connecting said spaced discs, said cylinders each having fluid inlets and outlets; a wabbler including a yoke pivotally mounted on one of said discs; a slide plate pivotally mounted on said yoke and frictionally engaging said slideway; pistons in said cylinders; connecting rods between said pistons and said slide plate; one element of a friction clutch secured to one of said discs, the other element of said friction clutch being slidably mounted co-axially with said axle and being normally restrained from engaging the first of said elements; yieldable means continuously tending to effect engagement of the elements of the clutch; and means operable from outside the wheel for effecting the engagement of the clutch elements at will.

6. A wheel comprising a hollow body having sides with hubs and having an annular rim connecting said sides to enclose therewith a fluid containing chamber; said wheel having an annular inclined slideway; an axle on which said wheel is rotatably mounted; means to seal the wheel and axle against escape of the liquid contents of the wheel; a rotor including spaced discs having hubs rotatably mounted on said axle, cylinders connecting said spaced discs, said cylinders each having fluid inlets and outlets; a wabbler including a yoke pivotally mounted on one of said discs; a slide plate pivotally mounted on said yoke and frictionally engaging said slideway; pistons in said cylinders; connecting rods between said pistons and said slide plate; one element of a friction clutch secured to one of said discs, the other element of said friction clutch being slidably mounted co-axially with said axle and being normally restrained from engaging the first of said elements; yieldable means continuously tending to effect engagement of the elements of the clutch; means operable from outside the wheel for effecting the engagement of the clutch elements at will; and means for retarding more or less the escape of liquid from the cylinders after the rotor has been brought to rest.

7. A wheel comprising a hollow body having sides with hubs and having an annular rim connecting said sides to enclose therewith a fluid containing chamber; said wheel having an annular inclined slideway; an axle on which said wheel is rotatably mounted; means to seal the wheel and axle against escape of the liquid contents of the wheel; a rotor including spaced discs having hubs rotatably mounted on said axle, cylinders connecting said spaced discs, said cylinders each having fluid inlets and outlets; a wabbler including a yoke pivotally mounted on one of said discs; a slide plate pivotally mounted on said yoke and frictionally engaging said slideway; pistons in said cylinders; connecting rods between said pistons and said slide plate; one element of a friction clutch secured to one of said discs, the other element of said friction clutch being slidably mounted co-axially with said axle and being normally restrained from engaging the first of said elements; yieldable means continuously tending to effect engagement of the elements of the clutch; means operable from outside the wheel for effecting the engagement of the clutch elements at will; and means for positively locking the rotor to the axle after its rotation has been stopped by the friction clutch.

8. A wheel comprising a hollow body having sides with hubs and having an annular rim connecting said sides to enclose therewith a fluid containing chamber; said wheel having an annular inclined slideway; an axle on which said wheel is rotatably mounted; means to seal the wheel and axle against escape of the liquid contents of the wheel; a rotor including spaced discs having hubs rotatably mounted on said axle, cylinders connecting said spaced discs, said cylinders each having fluid inlets and outlets; a wabbler including a yoke pivotally mounted on one of said discs; a slide plate pivotally mounted on said yoke and frictionally engaging said slideway; pistons in said cylinders; connecting rods between said pistons and said slide plate; one element of a friction clutch secured to one of said discs, the other element of said friction clutch being slidably mounted co-axially with said axle and being normally restrained from engaging the first of said elements; yieldable means continuously tending to effect engagement of the elements of the clutch; means operable from outside the wheel for effecting the engagement of the clutch elements at will; means for retarding more or less the escape of liquid from the cylinders after the rotor has been brought to rest; and means for positively locking the rotor to the axle after its rotation has been stopped by the friction clutch.

9. A wheel composed of two side discs having rim flanges, an annular rim center connected to said side discs' rim flanges, said side discs having hubs, and each of said side discs also having an inclined slideway; an axle on which said wheel is rotatably mounted; a hydraulically operated key slidably carried by said axle; a rotor which includes spaced apart discs, said rotor discs having hubs journalled on said axle; clutch teeth carried by each of said rotor discs; a united sleeve and ring slidably mounted on said axle and engaged by said key and having clutch teeth to mesh with the clutch teeth that are carried by said rotor; means continuously tending to de-clutch said teeth; and a hydraulic device connecting said rotor to said wheel with braking effect.

10. A wheel composed of two side discs having rim flanges, an annular rim center connected to said side discs' rim flanges, said side discs having hubs, and each of said side discs also having an inclined slideway; an axle on which said wheel is rotatably mounted; a manually controlled key slidably carried by said axle; a rotor which includes spaced apart discs, said rotor discs having hubs journalled on said axle; clutch teeth carried by each of said rotor discs; a united sleeve and ring slidably mounted on said axle and engaged by said key and having clutch teeth to mesh with the clutch teeth that are carried by said rotor; means continuously tending to de-clutch said teeth; a hydraulic device connecting said rotor to said wheel with braking effect; and a friction clutch element secured to said rotor and a friction clutch element cooperatively mounted on said axle so as to be engaged with the rotor friction clutch element before the toothed clutches become engaged.

11. A wheel composed of two side discs having rim flanges, an annular rim center connected to said side discs' rim flanges, said side discs having hubs, and each of said side discs also having an inclined slideway; an axle on which said wheel is rotatably mounted; a manually controlled key slidably carried by said axle; a rotor which includes spaced apart discs, said rotor discs having hubs journalled on said axle; clutch teeth carried by each of said rotor discs; a united sleeve and ring slidably mounted on said axle and engaged by said key and having clutch teeth to mesh with the clutch teeth that are carried by said rotor; means continuously tending to de-clutch said teeth; a hydraulic device connecting said rotor to said wheel with braking effect; a friction clutch element secured to said rotor and a friction clutch element cooperatively mounted on said axle so as to be engaged with the rotor friction clutch element before the toothed clutches become engaged; and means to permit said second mentioned friction clutch element to be slid along the axle while the toothed clutches are being engaged.

12. A wheel composed of two side discs having rim flanges, an annular rim center connected to said side discs' rim flanges, said side discs having hubs, and each of said side discs also having an inclined slideway; an axle on which said wheel is rotatably mounted; a manually operated key slidably carried by said axle; a rotor which includes spaced apart discs, said rotor discs having hubs journalled on said axle; clutch teeth carried by each of said rotor discs; a united sleeve and ring slidably mounted on said axle and engaged by said key and having clutch teeth to mesh with the clutch teeth that are carried by said rotor; means continuously tending to de-clutch said teeth; said rotor also including cylinders connecting the rotor discs together and having their axes parallel with that of the axle; pistons in said cylinders; universally mounted wabblers having slide plates to engage said slideways; connecting rods between said pistons and said slide plates; said cylinders having oil inlet ports and oil outlet ports; and means for controlling the escape of oil from said cylinders at will.

13. A wheel composed of two side discs having rim flanges, an annular rim center connected to said side discs' rim flanges, said side discs having hubs, and each of said side discs also having an inclined slideway; an axle on which said wheel is rotatably mounted; a manually operated key slidably carried by said axle; a rotor which includes spaced apart discs, said rotor discs having hubs journalled on said axle; clutch teeth carried by each of said rotor discs; a united sleeve and ring slidably mounted on said axle and engaged by said key and having clutch teeth to mesh with the clutch teeth that are carried by said rotor; means continuously tending to de-clutch said teeth; said rotor also including cylinders connecting the rotor discs together and having their axes parallel with that of the axle; pistons in said cylinders; universally mounted wabblers having slide plates to engage said slideways; connecting rods between said pistons and said slide plates; said cylinders having oil inlet ports and oil outlet ports; and means for controlling the escape of oil from said cylinders at will, said last named means including a valve common to all said oil outlets and carried by said ring.

14. An axle having a bore to provide a piston chamber and having a key slot, a piston in said chamber; a key in said slot; means connecting said piston to said key to move as one; a spring continuously tending to move said key and said piston backwardly; means for admitting hydraulic fluid into said chamber to move said piston and key in opposition to said spring; a wheel rotatably mounted on said axle and having a chamber, said wheel having two slideways spaced apart; a rotor within said chamber between said slideways and including side discs spaced apart and connected together by cylinders having oil inlets and outlets, two wabblers including wabbler slide plates universally mounted on said rotor side discs and slidably engaging said slideways, pistons in said cylinders and connecting rods between said last named pistons and said wabbler slide plates, said rotor being rotatably mounted on said axle normally to turn with the wheel; a sleeve slidably mounted on said axle and engaged by said key; a ring on said axle connected to said sleeve to move with it; said sleeve having clutch teeth; cooperating clutch teeth carried by the adjacent rotor side disc; clutch teeth carried by said ring and cooperating clutch teeth carried by the other rotor side disc, said clutch teeth being normally out of mesh; and a valve carried by said sleeve and ring for controlling the oil outlets of the cylinders to retard the escape of oil from the cylinders after the clutch teeth have been meshed.

15. An axle having a bore to provide a piston chamber and having a key slot; a piston in said chamber; a key in said slot; means connecting said piston to said key to move as one; a spring continuously tending to move said key and said piston backwardly; means for admitting hydraulic fluid into said chamber to move said piston and key in opposition to said spring; a wheel rotatably mounted on said axle and having a chamber, said wheel having two slideways spaced apart; a rotor within said chamber between said slideways and including side discs spaced apart and connected together by cylinders having oil inlets and outlets, two wabblers including wabbler slide plates universally mounted on said rotor side discs and slidably engaging said slideways, pistons in said cylinders and connecting rods between said last named pistons and said wabbler slide plates, said rotor being rotatably mounted on said axle normally to turn with the wheel; a sleeve slidably mounted on said axle and engaged by said key; a ring on said axle connected to said sleeve to move with it; said sleeve having clutch teeth; cooperating clutch teeth carried by the adjacent rotor side disc; clutch teeth carried by said ring and cooperating clutch teeth carried by the other rotor side disc, said clutch teeth being normally out of mesh; a valve carried by said sleeve and ring for controlling the oil outlets of the cylinders to retard the escape of oil from the cylinders after the clutch teeth have been meshed; a spring-loaded male friction clutch element slidably keyed to said sleeve; and a female friction clutch element carried by said rotor, the friction clutch elements being normally out of engagement but arranged to be brought into engagement before said clutch teeth are meshed.

16. A hollow wheel having an internal oppositely inclined pair of spaced apart slideways; an axle on which the wheel is journalled; a rotor including oppositely acting pistons in cylinders and universally mounted wabblers cooperating with said pistons and said slideways, said wabblers and said cylinders and pistons normally rotating with the wheel; operator controlled means for first stopping the rotation of the rotor on the axle and then locking the rotor to the axle and thereafter diminishing the escape of oil from the cylinders to increase the pressure of the wabblers on the wheel slideways to brake the wheel as desired.

17. A hollow wheel having an internal oppositely inclined pair of spaced apart slideways; an axle on which the wheel is journalled; a rotor including oppositely acting pistons in cylinders and universally mounted wabblers cooperating with said pistons and said slideways, said wabblers and said cylinders and pistons normally rotating with the wheel; a friction clutch device between the axle and the rotor; an operator controlled means for actuating said clutch devices for stopping rotation of the rotor and locking it to the axle; and means also controlled by the operator for controlling the escape of oil from the cylinders to effect a brake application to the wheel.

18. A hollow wheel having an internal oppositely inclined pair of spaced apart slideways; an axle on which the wheel is journalled; a rotor including oppositely acting pistons in cylinders and universally mounted wabblers cooperating with said pistons and said slideways, said wabblers and said cylinders and pistons normally rotating with the wheel; a friction clutch device between the axle and the rotor; an operator controlled means for actuating said clutch devices for stopping rotation of the rotor and locking it to the axle; means also controlled by the operator for controlling the escape of oil from the cylinders to effect a brake application to the wheel; and means independent of the operator's controlling means to relieve excessive pressure in the cylinders.

19. A hollow wheel, including inclined discs having at least one inclined slideway; an axle on which the wheel is rotatably mounted; a hydraulically operated shifting key slidably carried by said axle; a rotor which includes spaced apart discs, said rotor discs having hubs journalled on said axle; clutch teeth carried by said rotor discs; a sleeve slidably keyed to said axle by keys independent of said shifting key, said sleeve being engaged by said shifting key, said sleeve having clutch teeth to mesh with the clutch teeth of said rotor clutch teeth; means continuously tending to de-clutch said teeth; and a hydraulic device connecing said rotor to said wheel with braking effect.

20. A wheel composed of two side discs having rim flanges, an annular rim center connected to said side discs' rim flanges, said side discs having hubs, and each of said side discs also having an inclined slideway; an axle on which said wheel is rotatably mounted; a manually operated key slidably carried by said axle; a rotor which includes spaced apart discs, said rotor discs having hubs journalled on said axle; clutch teeth carried by each of said rotor discs; a united sleeve and ring slidably mounted on said axle and engaged by said key and having clutch teeth to mesh with the clutch teeth that are carried by said rotor; means continuously tending to declutch said teeth; said rotor also including cylinders connecting the rotor discs together and having their axes parallel with that of the axle; pistons in said cylinders; universally mounted wabblers having slide plates to engage said slideways; connecting rods between said pistons and said slide plates; said cylinders having oil inlet ports and oil outlet ports; means for controlling the escape of oil from said cylinders at will, said last named means including a valve common to all said oil outlets and carried by asid ring; and means to relieve said cylinders of excessive pressure when the oil outlets of the cylinders are closed.

CLAYTON ERASMUS FREDERICKSON.